UNITED STATES PATENT OFFICE.

EDWIN P. FOWLER, OF NATIONAL CITY, CALIFORNIA.

PROCESS OF REMOVING VERMIN OR SCALES FROM PLANTS.

SPECIFICATION forming part of Letters Patent No. 408,608, dated August 6, 1889.

Application filed January 24, 1889. Serial No. 297,436. (No specimens.)

*To all whom it may concern:*

Be it known that I, EDWIN P. FOWLER, a citizen of the United States, residing at National City, in the county of San Diego and State of California, have invented new and useful Improvements in the Process of Removing Vermin or Scales from Plants, of which the following is a specification.

The object of this invention is to remove and eventually destroy vermin which are liable to cause injury to vines or other plants of a similar nature, and also to remove growths—such as those known by the term "scale"—which appear in the form of white protuberances formed of fibrous cotton-like matter and containing vermin, and which destroy yearly entire groves of lemon and orange trees in Florida, South California, and other tropical states.

In carrying out my invention I take a fan-blower of any suitable construction, or any other apparatus capable of creating an artificial current of air. The artificial current of air thus created I direct against the tree or other plant, and in its transit from the fan-blower to the plant I charge said current of air with sand. Of course the force of the artificial air-current must be carefully gaged, so that the sand which is projected by the same against the trees or plants will not destroy the plants together with the vermin or scale, and the sand must be sifted, so that no coarse particles or stones remain mixed with it. I have found that if the force of the air-current is properly limited, according to the nature of the plants under treatment, the scale or vermin can be removed without injuring the trees or plants.

In some cases it is desirable that the artificial current of air shall be heated, and for this purpose I combine with the fan-blower or other apparatus a suitable heater. It may also be desirable in certain contingencies that the sand which is used for charging the artificial air-current shall be hot, and for the purpose of heating the sand before introducing it into the air-current any suitable heating apparatus may be used.

What I claim as new, and desire to secure by Letters Patent, is—

1. The process of removing vermin or scale from plants or trees, which consists in exposing the plants or trees to an artificial current of air charged with sand, substantially as set forth.

2. The process of removing vermin or scale from plants or trees, which consists in exposing the plants or trees to an artificial current of heated air charged with sand, substantially as set forth.

3. The process of removing vermin or scale from plants or trees, which consists in exposing the plants or trees to an artificial current of air charged with hot sand, substantially as set forth.

In testimony whereof I have hereunto set my hand and seal in the presence of two subscribing witnesses.

EDWIN P. FOWLER. [L. S.]

Witnesses:
J. VAN SANTVOORD,
ERNST F. KASTENHUBER.